United States Patent
Shingu et al.

(10) Patent No.: US 10,503,969 B2
(45) Date of Patent: Dec. 10, 2019

(54) HAND-RAISING DETECTION DEVICE, NON-TRANSITORY COMPUTER READABLE MEDIUM, AND HAND-RAISING DETECTION METHOD

(71) Applicant: FUJI XEROX CO., LTD., Tokyo (JP)

(72) Inventors: Jun Shingu, Kanagawa (JP); Masatsugu Tonoike, Kanagawa (JP); Daisuke Ikeda, Kanagawa (JP); Yusuke Uno, Kanagawa (JP); Yusuke Yamaura, Kanagawa (JP); Ryoko Usuba, Kanagawa (JP); Takeshi Onishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 109 days.

(21) Appl. No.: 15/223,807

(22) Filed: Jul. 29, 2016

(65) Prior Publication Data

US 2017/0277943 A1 Sep. 28, 2017

(30) Foreign Application Priority Data

Mar. 25, 2016 (JP) .................. 2016-062499

(51) Int. Cl.
*G06K 9/00* (2006.01)
*G06T 7/20* (2017.01)
*H04N 13/20* (2018.01)
*H04N 13/00* (2018.01)
*G06K 9/62* (2006.01)
(Continued)

(52) U.S. Cl.
CPC ......... *G06K 9/00355* (2013.01); *G06F 3/017* (2013.01); *G06K 9/6214* (2013.01); *G06T 7/20* (2013.01); *G06T 7/70* (2017.01); *G06T 2207/30196* (2013.01); *H04N 2013/0085* (2013.01)

(58) Field of Classification Search
CPC .......... G06F 3/017; G06F 3/011; G06F 3/016; G06F 3/014; G06F 1/163; G06F 3/0346; G06F 3/0482; G06F 3/04883; G06F 3/04842; G06F 3/167; G06F 3/0304; G06F 1/1698; G06F 2203/04808; G06F 3/012
See application file for complete search history.

(56) References Cited

U.S. PATENT DOCUMENTS 7,324,080 B1 * 1/2008 Hu ................. G09G 3/3413
345/102
7,427,140 B1 * 9/2008 Ma ................. G06F 1/1616
353/30
(Continued)

FOREIGN PATENT DOCUMENTS

JP 2005-242759 A 9/2005
JP 2007-048232 A 2/2007

*Primary Examiner* — Dave Czekaj
*Assistant Examiner* — Kehinde Abimbola
(74) *Attorney, Agent, or Firm* — Oliff PLC (57) ABSTRACT

A hand-raising detection device includes a converter and a detection unit. The converter performs conversion of a predetermined space including a person into an overhead view image by using a result of three dimensional measurement performed on the predetermined space. The detection unit performs detection of a hand-raising action by using a silhouette image of the person in the overhead view image resulting from the conversion performed by the converter.

9 Claims, 8 Drawing Sheets

(51) Int. Cl.
    *G06F 3/01*     (2006.01)
    *G06T 7/70*     (2017.01)

(56) References Cited

U.S. PATENT DOCUMENTS

| | | | | |
|---|---|---|---|---|
| 7,853,288 B2* | 12/2010 | Ma | .................... | H04W 52/027 |
| | | | | 345/102 |
| 8,125,163 B2* | 2/2012 | Dunn | ................ | H05B 33/0872 |
| | | | | 315/158 |
| 8,508,155 B2* | 8/2013 | Schuch | ............ | G02F 1/133603 |
| | | | | 315/158 |
| 8,829,815 B2* | 9/2014 | Dunn | ................ | H05B 33/0872 |
| | | | | 315/158 |
| 8,830,189 B2* | 9/2014 | Rimon | ................... | G06F 3/044 |
| | | | | 345/173 |
| 8,896,531 B2* | 11/2014 | Minnen | ................... | G06F 3/017 |
| | | | | 345/158 |
| 8,933,882 B2* | 1/2015 | Burachas | ............... | G06F 3/012 |
| | | | | 345/157 |
| 9,030,129 B2* | 5/2015 | Dunn | ................ | H05B 33/0872 |
| | | | | 315/158 |
| 9,167,655 B2* | 10/2015 | Dunn | ................ | H05B 33/0872 |
| 9,529,446 B2* | 12/2016 | Hung | ................... | G06F 3/017 |
| 9,812,047 B2* | 11/2017 | Schuch | ................... | H04L 41/22 |
| 9,867,253 B2* | 1/2018 | Dunn | ................ | H05B 33/0854 |
| 9,924,583 B2* | 3/2018 | Schuch | ............. | H05B 37/0281 |
| 10,133,454 B2* | 11/2018 | Wilson | ................... | G06F 3/0483 |
| 2007/0222910 A1* | 9/2007 | Hu | ....................... | G02B 6/0088 |
| | | | | 349/58 |
| 2009/0021461 A1* | 1/2009 | Hu | ................... | G02F 1/133603 |
| | | | | 345/88 |
| 2009/0061945 A1* | 3/2009 | Ma | .................... | H04W 52/027 |
| | | | | 455/566 |
| 2009/0289580 A1* | 11/2009 | Dunn | ................ | H05B 33/0872 |
| | | | | 315/307 |
| 2010/0231563 A1* | 9/2010 | Dunn | ................... | G09G 3/006 |
| | | | | 345/207 |
| 2010/0235786 A1* | 9/2010 | Maizels | ................. | G06F 3/011 |
| | | | | 715/810 |
| 2011/0279397 A1* | 11/2011 | Rimon | ................... | G06F 3/044 |
| | | | | 345/173 |
| 2011/0283199 A1* | 11/2011 | Schuch | ................... | H04L 41/22 |
| | | | | 715/740 |
| 2012/0051658 A1* | 3/2012 | Tong | ................... | G11B 27/034 |
| | | | | 382/224 |
| 2012/0062736 A1* | 3/2012 | Xiong | ................... | G06F 3/017 |
| | | | | 348/143 |
| 2012/0086344 A1* | 4/2012 | Schuch | ............. | G02F 1/133603 |
| | | | | 315/152 |
| 2012/0268364 A1* | 10/2012 | Minnen | ................... | G06F 3/017 |
| | | | | 345/156 |
| 2012/0299891 A1* | 11/2012 | Fujiwara | ............... | G09G 3/3426 |
| | | | | 345/207 |
| 2012/0326963 A1* | 12/2012 | Minnen | ................... | G06F 3/017 |
| | | | | 345/156 |
| 2013/0016080 A1* | 1/2013 | Dunn | ................ | H05B 33/0872 |
| | | | | 345/207 |
| 2014/0184494 A1* | 7/2014 | Burachas | ................ | G06F 3/012 |
| | | | | 345/156 |
| 2014/0285477 A1* | 9/2014 | Cho | ....................... | G09G 3/2003 |
| | | | | 345/207 |
| 2014/0304647 A1* | 10/2014 | Maizels | ................... | G06F 3/011 |
| | | | | 715/800 |
| 2014/0340375 A1* | 11/2014 | Dunn | ................ | H05B 33/0872 |
| | | | | 345/207 |
| 2015/0169947 A1* | 6/2015 | Kawaguchi | ............. | G01S 5/163 |
| | | | | 382/103 |
| 2015/0245443 A1* | 8/2015 | Dunn | ................ | H05B 33/0872 |
| | | | | 315/152 |
| 2015/0297986 A1* | 10/2015 | Dal Mutto | ............ | A63F 13/213 |
| | | | | 463/31 |
| 2016/0018957 A1* | 1/2016 | Wilson | ................... | G06F 17/217 |
| | | | | 715/776 |
| 2016/0037606 A1* | 2/2016 | Dunn | ................ | H05B 33/0872 |
| | | | | 349/61 |
| 2016/0187991 A1* | 6/2016 | Hung | ................... | G06F 3/017 |
| | | | | 345/156 |
| 2016/0334666 A1* | 11/2016 | Liu | ................... | G02F 1/133382 |
| 2016/0335705 A1* | 11/2016 | Williams | ............... | H04W 4/80 |
| 2016/0338181 A1* | 11/2016 | Schuch | ............. | H05B 37/0281 |
| 2016/0338182 A1* | 11/2016 | Schuch | ............. | H05B 37/0281 |
| 2016/0351133 A1* | 12/2016 | Kim | ................... | G09G 3/3406 |
| 2016/0358538 A1* | 12/2016 | Schuch | ............. | H05B 37/0218 |
| 2018/0012566 A1* | 1/2018 | Lin | .......................... | G09G 5/10 |
| 2018/0061297 A1* | 3/2018 | Schuch | ................... | H04N 17/00 |

* cited by examiner

SILHOUETTED PERSON

FITTED ELLIPSE

SILHOUETTED PERSON

FITTED ELLIPSE

HAND-RAISING DETECTION DEVICE, NON-TRANSITORY COMPUTER READABLE MEDIUM, AND HAND-RAISING DETECTION METHOD

CROSS-REFERENCE TO RELATED APPLICATIONS

This application is based on and claims priority under 35 USC 119 from Japanese Patent Application No. 2016-062499 filed Mar. 25, 2016.

BACKGROUND

Technical field

The present invention relates to a hand-raising detection device, a non-transitory computer readable medium, and a hand-raising detection method.

SUMMARY

According to an aspect of the invention, there is provided a hand-raising detection device including a converter and a detection unit. The converter performs conversion of a predetermined space including a person into an overhead view image by using a result of three dimensional measurement performed on the predetermined space. The detection unit performs detection of a hand-raising action by using a silhouette image of the person in the overhead view image resulting from the conversion performed by the converter.

BRIEF DESCRIPTION OF THE DRAWINGS

An exemplary embodiment of the present invention will be described in detail based on the following figures, wherein.

DETAILED DESCRIPTION

Figure 1:
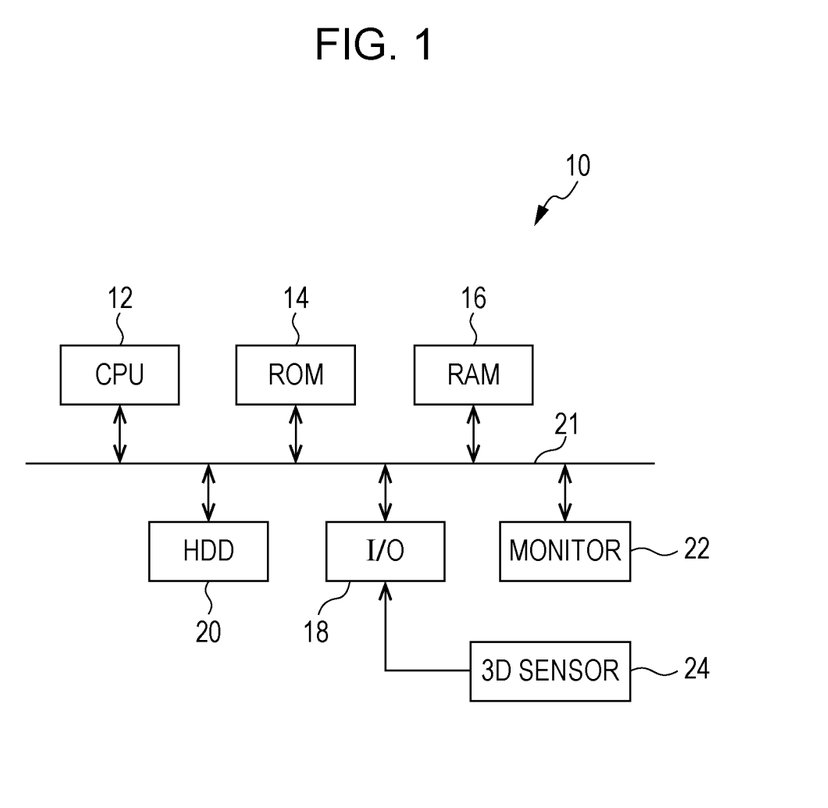
FIG. 1 illustrates a schematic configuration of a hand-raising detection device according to the exemplary embodiment.

Hereinafter, an example of an exemplary embodiment will be described in detail with reference to the drawings. FIG. 1 illustrates a schematic configuration of a hand-raising detection device according to the exemplary embodiment.

A hand-raising detection device 10 according to the exemplary embodiment detects an action of raising a hand performed by a person in a shop, in front of digital signage, in a meeting room, or the like. For example, the hand-raising detection device 10 is provided to detect whether a person raises a hand to access a product in a store or a gesture such as pointing at a large screen.

As illustrated in FIG. 1, the hand-raising detection device 10 according to the exemplary embodiment includes a computer including a central processing unit (CPU) 12, a read-only memory (ROM) 14, a random-access memory (RAM) 16, and an input/output device (I/O) 18 that are connected to a bus 21.

Further, not only a monitor 22 but also a memory device such as a hard disk (HDD) 20 is connected to the bus 21. The monitor 22 displays various pieces of information and images, and the HDD 20 stores various pieces of data such as various databases.

The ROM 14 stores a hand-raising detection program (described later in detail) for detecting an action of raising a hand performed by a person and other programs. The CPU 12 runs these programs to thereby execute various processes.

A three-dimensional (3D) sensor 24 is connected to the I/O 18. The 3D sensor 24 three-dimensionally scans a predetermined space including the 3D sensor 24 and thereby three-dimensionally measures the space. For example, laser light or the like is radiated in a scanning manner, and the 3D sensor 24 receives reflected light. The 3D sensor 24 detects a distance to an object from which the laser light is reflected and thereby measures 3D points. Results of the 3D scanning performed by the 3D sensor 24 are stored in the HDD 20 as a 3D point cloud. The locations, inclinations, and the like that are known regarding points in the space are used, for the 3D sensor 24, and the 3D coordinates of the scanned 3D points may he converted into room coordinates.

Note that the computer included in the hand-raising detection device 10 also includes not only the aforementioned components but also input devices such as a keyboard and other peripheral devices. In addition, the I/O 18 may be connected to a network or the like in addition to the aforementioned components, and the computer thus may perform communication with another device connected to the network.

Figure 2:
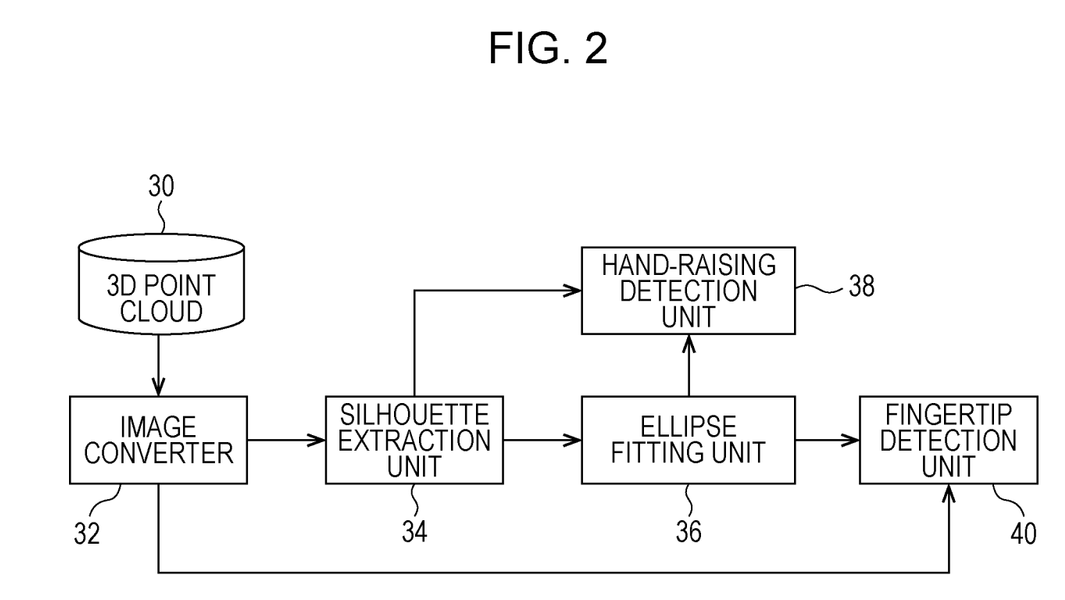
FIG. 2 is a functional block diagram illustrating functions implemented by a hand-raising detection program in the hand-raising detection device according to the exemplary embodiment.

FIG. 2 is a functional block diagram illustrating functions implemented by the hand-raising detection program in the hand-raising detection device 10 according to the exemplary embodiment.

The hand-raising detection program has functions of a 3D point cloud 30, an image converter 32, a silhouette extraction unit 34, an ellipse fitting unit 36, a hand-raising detection unit 38, and a fingertip detection unit 40.

Figure 3:
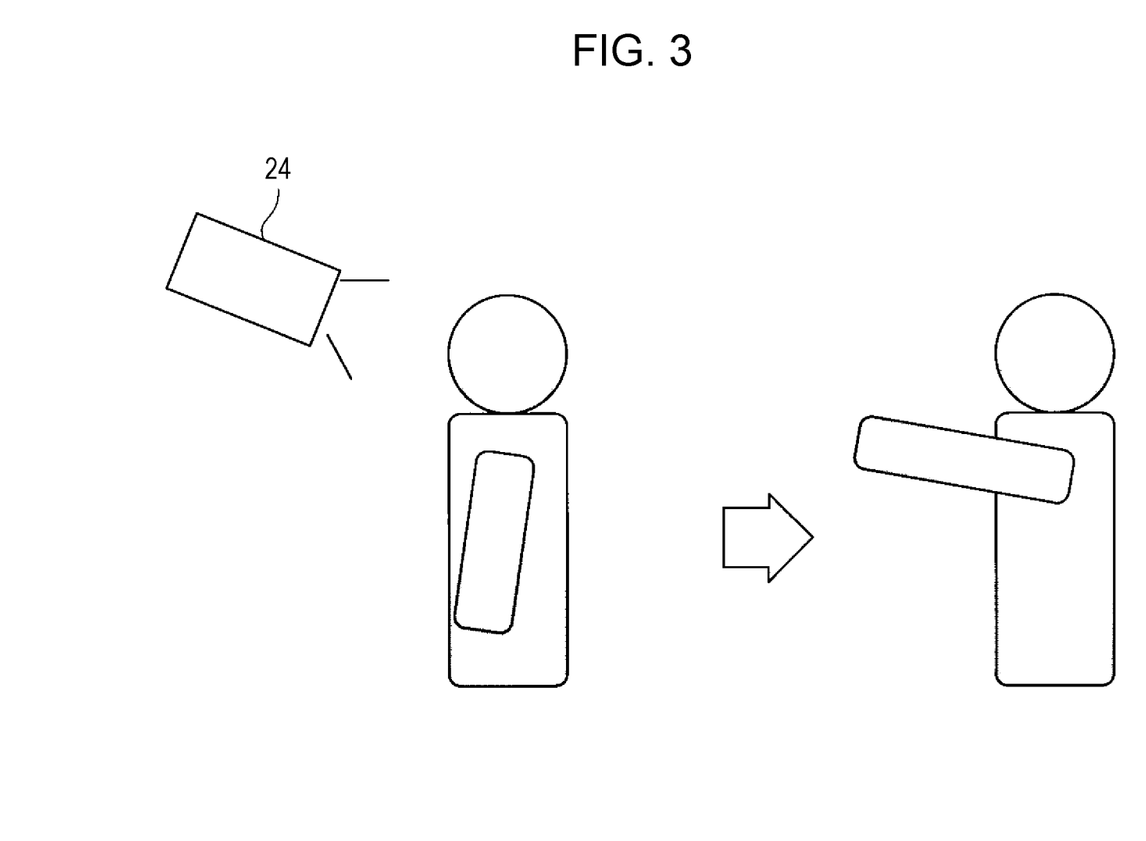
FIG. 3 illustrates how a 3D sensor detects a person.

The 3D point cloud 30 is a set of pieces of 3D point data detected as a result of the 3D scanning performed by the 3D sensor 24 on the predetermined space including the 3D sensor 24. The detected set of pieces of 3D point data is stored as a 3D point cloud in the HDD 50. The result of detection performed by the 3D sensor 24 is stored occasionally, and a hand-raised state changing from a hand-lowered state, for example, as illustrated in FIG. 3 is thereby detected by the 3D sensor 24. The detection result is stored as the 3D point cloud.

Figure 4A:
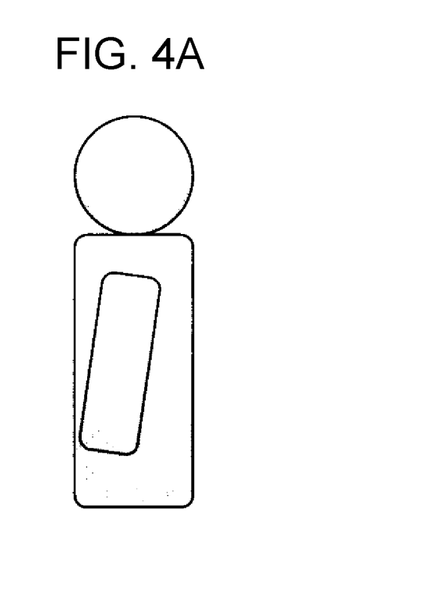
FIG. 4A illustrates a person with a hand not raised.
Figure 4B:
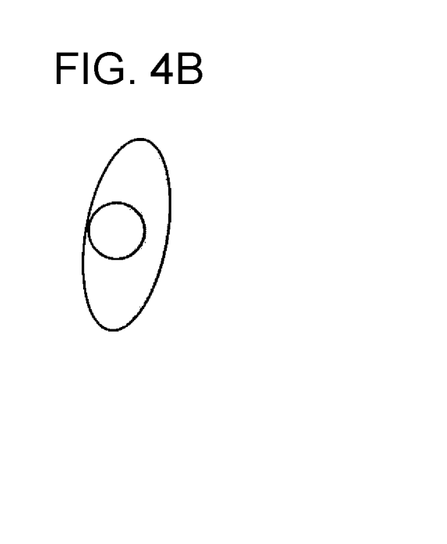
FIG. 4B illustrates an overhead view image of FIG. 4A.
Figure 4C:
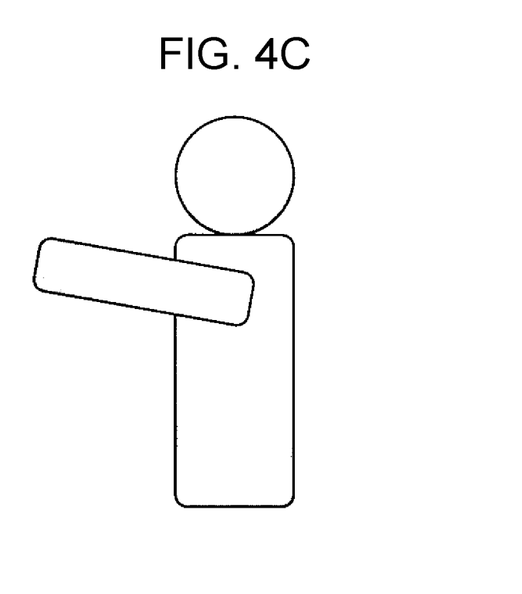
FIG. 4C illustrates a person with a hand raised.
Figure 4D:
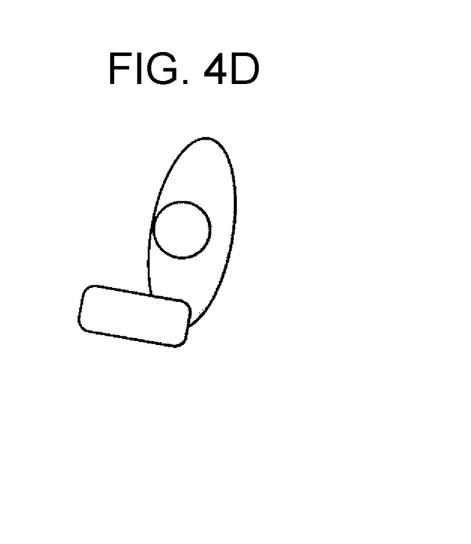
FIG. 4D illustrates an overhead view image of FIG. 4C.

The image converter 32 converts the 3D point data of the 3D point cloud 30 into a depth image of the person viewed from above in the room (hereinafter, referred to as an overhead depth image). For example, an image of a person with a hand not raised in FIG. 4A is converted into an overhead view image as in FIG. 4B. An image of a person with a hand raised in FIG. 4C is converted into an overhead view image as in FIG. 4D. In other words, the image is converted into a bird's-eye view image, and pixels have values based on height.

Figure 5A:
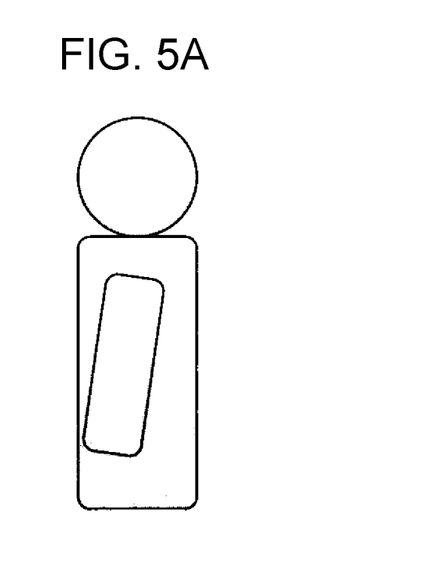
FIG. 5A illustrates a person with a hand not raised.
Figure 5B:
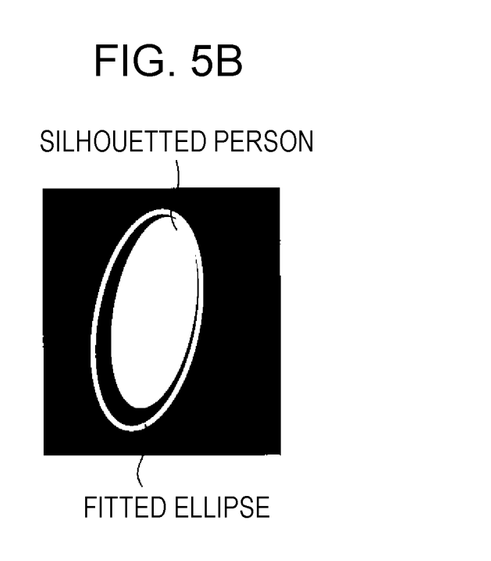
FIG. 5B illustrates a silhouetted binary linage of an overhead view image of FIG. 5A and an ellipse fitted to the overhead view image (hereinafter, referred to as a fitted ellipse)
Figure 5C:
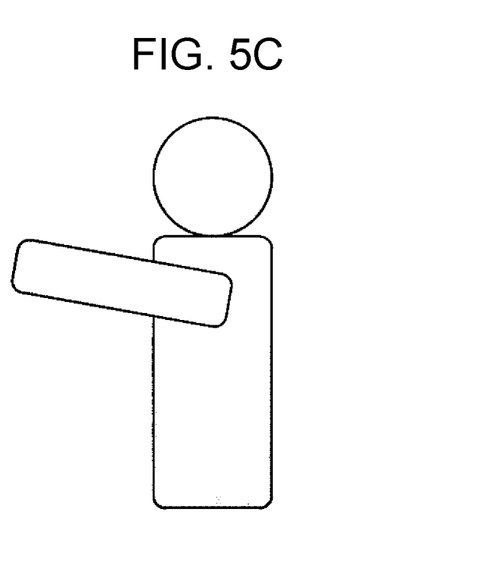
FIG. 5C illustrates a person with a hand raised.

The silhouette extraction unit 34 silhouettes the image resulting from the conversion performed by the image converter 32 and extracts s region around a person as a silhouette image. Note that silhouetting herein corresponds to a process of causing a region inside the contour of an image to have a single color. For example, in the exemplary embodiment, binarization is performed in the following manner based on the image data regarding the overhead depth image resulting from the conversion performed by the image converter 32. Specifically, an image data value lower than a threshold is regarded as an image data value corresponding to the height of a floor, and a black pixel is used for the image data value. A white pixel is used for an image data value higher than the floor height. The image resulting from the conversion is thereby silhouetted to represent a specific region in the overhead depth image in a single color. The region corresponding to the person (portion higher than the floor) is extracted as a silhouette image. Specifically, a person with a hand lowered as in FIG. 5A is silhouetted as a binary image as in FIG. 5B, and a silhouette image is extracted. A person with a hand raised as in FIG. 5C is silhouetted as a binary image as in FIG. 5D, and a silhouette image is extracted.

The ellipse fitting unit 36 fits, to the person region extracted by the silhouette extraction unit 34, an ellipse that is circumscribed about the person region. For example, an ellipse is fitted to the person with a hand lowered as in FIG. 5B, and an ellipse is fitted to the person with a hand raised as in FIG. 5D.

Figure 5D:
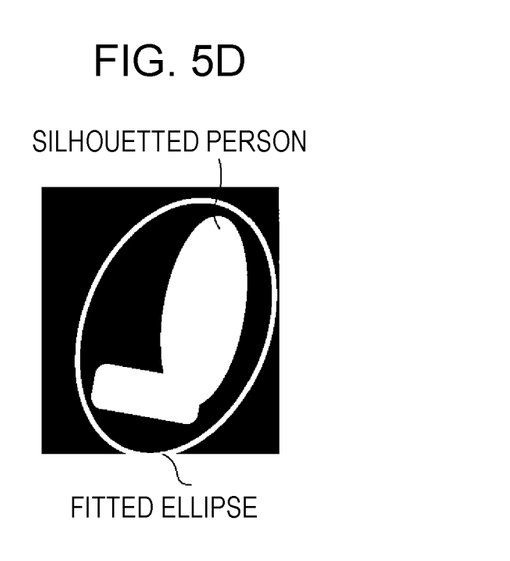
FIG. 5D illustrates a silhouetted binary image of an overhead view image of FIG. 5C and a fitted ellipse.

The hand-raising detection unit 38 detects a hand-raising action by using the silhouette image extracted by the silhouette extraction unit 34 and the ellipse fitted to the silhouette image by the ellipse fitting unit 36. For example, the hand-raising detection unit 38 detects the hand-raising action by using an area ratio between the area of the silhouette image and the area of the fitted ellipse. Specifically, as illustrated in FIG. 5B, if a hand of the person is lowered, the area of the ellipse is almost equal to the area of the silhouette image. In contrast, as illustrated in FIG. 5D, if a hand of the person is raised, the area of the ellipse is larger than the area of the silhouette image. Accordingly, if a silhouette area ratio obtained by dividing the area of the silhouette image by the area of the fitted ellipse is smaller than a predetermined threshold, the hand-raising detection unit 38 judges that a hand of the person is raised. Alternatively, if an area ratio obtained by dividing the area of the ellipse by the area of the silhouette image is larger than a predetermined threshold, the hand-raising detection unit 38 may judge that a hand is raised.

Figure 6A:
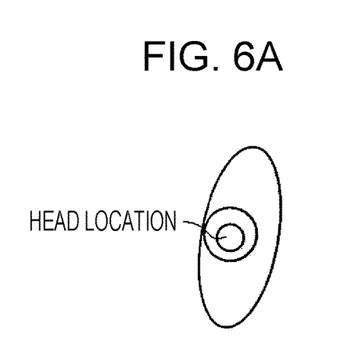
FIG. 6A illustrates a head location that is highest in a hand-lowered state.
Figure 6B:
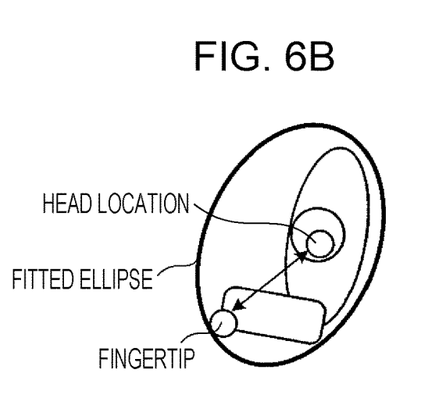
FIG. 6B illustrates a fingertip located farthest from the bead location in the ellipse.

As illustrated in FIG. 6A, the fingertip detection unit 40 detects, as the location of the head, the location that is highest in a hand-lowered state in the overhead depth image resulting from the conversion performed by the image converter 32. As illustrated in FIG. 6B, the fingertip detection unit 40 also detects, as the location of a fingertip, the location that is farthest from the head location in the ellipse fitted by the ellipse fitting unit 36.

Note that if the person raises a hand to a location higher than the head, the fingertip detection unit 40 may confuse the fingertip location with the head location in the fingertip location detection. Accordingly, the head location may be tracked, and a suddenly changed location may be judged to be the fingertip location. Alternatively, since the head is not located at the end of the ellipse unlike a fingertip, this may be utilized to distinguish the fingertip location from the head location.

Figure 6C:
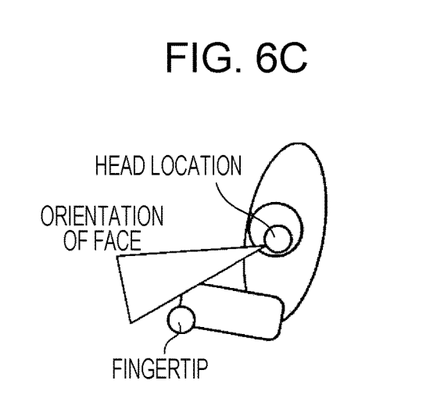
FIG. 6C illustrates a case where a vector extending from the head in the same direction as the orientation of the face is close to a vector extending from the head to the fingertip.
Figure 6D:
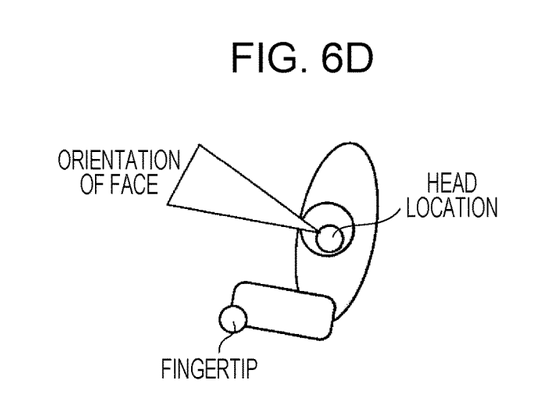
FIG. 6D illustrates a case where the vector extending from the bead in the same direction as the orientation of the face is far from the vector extending from the head to the fingertip.

In addition, when detecting the fingertip, the fingertip detection unit 40 may detect the orientation of the face to enhance the reliability of a fingertip detection result. For example, as illustrated in FIG. 6C, the orientation of the face and the fingertip location are detected. If a vector extending from the head in the same direction as the orientation of the race is close to a vector extending from the head to the fingertip (for example, an angle between the vectors is lower than a predetermined threshold), the reliability of the fingertip detection result is judged to be high. In contrast, as illustrated in FIG. 6D, a vector extending from the head in the same direction as the orientation of the face is far from a vector extending from the head to the fingertip (for example, an angle between the vectors is equal to or higher than the predetermined threshold), the reliability of the fingertip detection result is judged to be low. The orientation of the face is detected by using an image taken by an existing camera and the depth image on the basis of the 3D location of the head and a head size range roughly obtained. The detection is performed fey using a well-known technique.

Figure 7:
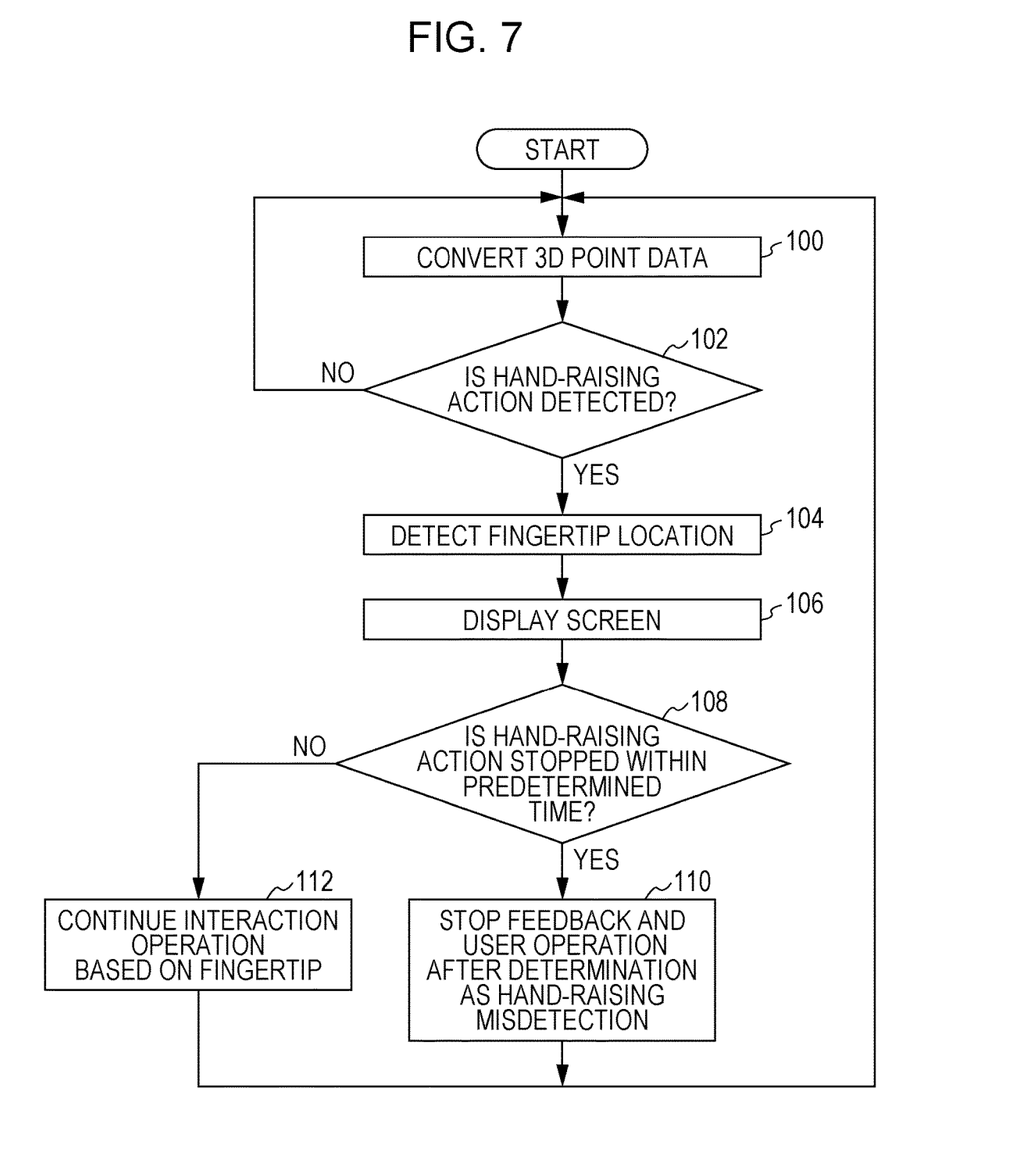
FIG. 7 is a flowchart illustrating an example process executed by the hand-raising detection device according to the exemplary embodiment.

A specific process performed by the hand-raising detection device 10 according to the exemplary embodiment in the configuration as described above will be described. FIG. 7 is a flowchart illustrating an example process executed by the hand-raising detection device 10 according to the exemplary embodiment. To execute the process in FIG. 7, the CPU 12 loads, into the RAM 16, the hand-raising detection program stored in the ROM 14 and runs the hand-raising detection program.

In step 100, the image converter 32 converts 3D point data in the 3D point cloud 30 into a depth image viewed from above in the room, and the process proceeds to step 102.

In step 102, it is judged whether the hand-raising detection unit 38 detects a hand-raising action. Based on the detection result, the silhouette extraction unit 34 extracts a silhouette image, and the ellipse fitting unit 36 fits an ellipse to a person region. A silhouette area ratio is obtained by dividing the area of the silhouette image by the area of the fitted ellipse, and it is judged whether the obtained silhouette area ratio is smaller than the predetermined threshold. If the judgment has a negative result, the process returns to step 100 to repeat the aforementioned steps. If the judgment has an affirmative result, the process proceeds to step 104.

In step 104, the fingertip detection unit 40 detects the fingertip location, and the process proceeds to step 106. In other words, the fingertip detection unit 40 detects, as the head location, the location that is highest in the hand-lowered state in the overhead depth image resulting from the conversion performed by the image converter 32 and also detects, as the fingertip location, the location that is farthest from the head location in the ellipse fitted by the ellipse fitting unit 36.

In step 106, the fingertip detection unit 40 displays, on the monitor 22, a video of an operator, a pointer for the fingertip, and the like, and the process proceeds to step 108.

In step 108, the hand-raising detection unit 38 judges whether the hand-raising action is stopped within a predetermined period of time. Whether the hand-raising action ends within the predetermined period of time is judged in order to judge whether the hand-raising action is wrongly detected. If the judgment has an affirmative result, the process proceeds to step 110. If the judgment has a negative result, the process proceeds to step 112.

In step 110, the hand-raising detection unit 38 determines that the hand-raising action is wrongly detected. The hand-raising detection unit 38 thus performs feedback and stops user operation. The process returns to step 100 to repeat the aforementioned steps. That is, if the hand-raising action is stopped within the predetermined period of time, it is judged that the hand-raising action has been wrongly judged. Since the detection sensitivity for the hand-raising action is too high, feedback such as adjusting the threshold or the like for the silhouette area ratio provided for judging the hand-raising action is performed, and user operations such as clicking displayed content are stopped.

In step 112, the fingertip detection unit 40 continues an interaction operation based on the fingertip. The process then returns to step 100 to repeat the aforementioned steps. That is, the fingertip detection unit 40 detects, as the head location, the location that is highest in the hand-lowered state in the overhead depth image resulting from the conversion performed by the image converter 32 and also detects, as the fingertip location, the location that is farthest from the head location in the ellipse fitted by the ellipse fitting unit 36. The fingertip location detected by the fingertip detection unit 40 is used as a pointing operation and other operations. If the fingertip location is found, it is understood which part of a shelf in the store a person touches or what a person is pointing at in the meeting room. As described above, when detecting a fingertip, the fingertip detection unit 48 may further detect the orientation of the face to check whether the fingertip location is correct.

Figure 8A:
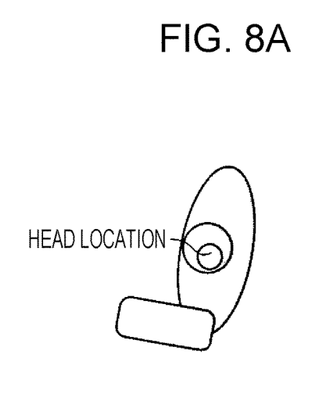
FIG. 8A illustrates a detection example of the head location using a depth image.
Figure 8B:
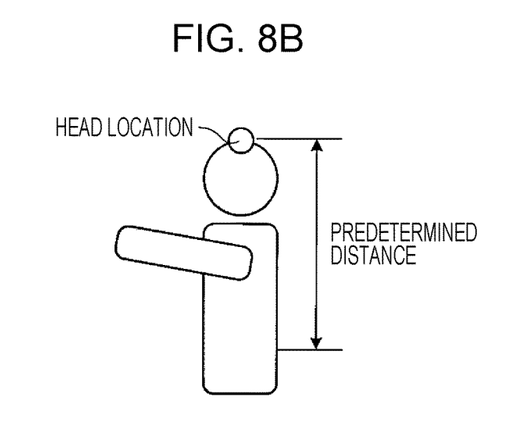
FIG. 8B illustrates a height within a predetermined distance from the head location.

In addition, the height within which the hand-raising action is detected by the hand-raising detection unit 38 may be limited in the exemplary embodiment described above. For example, as illustrated in FIG. 8A, the head location is detected by using a depth image resulting from the conversion performed by the image converter 32. As illustrated in FIG. 8B, the hand-raising is subsequently detected by using only a depth image having a height equal to or shorter than a predetermined distance from the head location or only a depth image having a height equal to or higher than a predetermined height from the floor. Specifically, to extract a silhouette image, the silhouette extraction unit 34 performs the binarization based on whether the height of depth image is equal to or shorter than the predetermined distance from the head location or is equal to or higher than the predetermined height from the floor. This excludes a part other than an arm such as legs in a sitting state from the depth image and enhances the hand-raising detection accuracy.

In addition, the process executed by the hand-raising detection device 10 according to the exemplary embodiment may be stored as a program in a storage medium for distribution.

The exemplary embodiment is not limited to the exemplary embodiment described above. It goes without saying that the exemplary embodiment may be performed after any of various modifications is made without departing from the spirit of the exemplary embodiment.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A hand-raising detection device comprising:
 a converter that performs conversion of a non-overhead view image of a predetermined real-world space including a real-world person into an overhead view image by using a result of three dimensional measurement performed on the predetermined space; and
 a detection unit that performs detection of a hand-raising action by using a silhouette image of the person in the overhead view image resulting from the conversion performed by the converter by:
   determining an area of an ellipse that is fitted to the silhouette image of the person in the overhead view image,
   determining an area of the silhouette image of the person in the overhead view image,
   determining an area ratio between the area of the ellipse that is fitted to the silhouette image of the person and the area of the silhouette image of the person, and
   determining that the hand-raising action is detected by comparing the determined area ratio to a predetermined threshold.

2. The hand-raising detection device according to claim 1, further comprising:
 a fingertip detection unit that detects a location of a fingertip of the person if the detection unit detects the hand-raising action.

3. The hand-raising detection device according to claim 2, wherein the fingertip detection unit regards, as a location of a head of the person, a location that is highest in the silhouette image when the person does not perform the hand-raising action, and the fingertip detection unit detects, as the location of the fingertip, a location that is farthest from the location of the head in an ellipse that is fitted to the silhouette image.

4. The hand-raising detection device according to claim 2, wherein the fingertip detection unit further detects an orientation of a face of the person and judges whether the detected location of the fingertip is appropriate.

5. The hand-raising detection device according to claim 1, further comprising:
 a display that displays, as an image, a result of the detection performed by the detection unit.

6. The hand-raising detection device according to claim 1, wherein the detection unit performs the detection of the hand-raising action by using a silhouette image having a height equal to or shorter than a predetermined distance from a location of a head of the person.

7. A non-transitory computer readable medium storing a program causing a computer to function as the hand-raising detection device according to claim 1.

8. A hand-raising detection method comprising:
    performing conversion of a non-overhead view image of a real-world predetermined space including a real-world person into an overhead view image by using a result of three dimensional measurement performed on the predetermined space; and
    detecting a hand-raising action by using a silhouette image of the person in the overhead view image resulting from the conversion by:
        determining an area of an ellipse that is fitted to the silhouette image of the person in the overhead view image,
        determining an area of the silhouette image of the person in the overhead view image,
        determining an area ratio between the area of the ellipse that is fitted to the silhouette image of the person and the area of the silhouette image of the person, and
        determining that the hand-raising action is detected by comparing the determined area ratio to a predetermined threshold.

9. A hand-raising detection device comprising:
    a processor that executes a program that:
        performs conversion of a non-overhead view image of a real-world predetermined space including a real-world person into an overhead view image by using a result of three dimensional measurement performed on the predetermined space; and
        performs detection of a hand-raising action by using a silhouette image of the person in the overhead view image resulting from the conversion, by
            determining an area of an ellipse that is fitted to the silhouette image of the person in the overhead view image,
            determining an area of the silhouette image of the person in the overhead view image,
            determining an area ratio between the area of the ellipse that is fitted to the silhouette image of the person and the area of the silhouette image of the person, and
            determining that the hand-raising action is detected by comparing the determined area ratio to a predetermined threshold.

\* \* \* \* \*